United States Patent [19]

Millgard

[11] Patent Number: 5,625,260
[45] Date of Patent: Apr. 29, 1997

[54] SYSTEMS AND METHODS FOR TRANSMITTING PULSE SIGNALS

[75] Inventor: Lars Millgard, Ostersund, Sweden

[73] Assignee: Airport Technology in Scandinavia AB, Sweden

[21] Appl. No.: 436,366

[22] PCT Filed: Nov. 19, 1993

[86] PCT No.: PCT/SE93/00994

§ 371 Date: Dec. 5, 1995

§ 102(e) Date: Dec. 5, 1995

[87] PCT Pub. No.: WO94/13119

PCT Pub. Date: Jun. 9, 1994

[30] Foreign Application Priority Data

Nov. 20, 1992 [SE] Sweden ................................ 9203491-7
Jan. 22, 1993 [SE] Sweden ................................ 9300193-1

[51] Int. Cl.$^6$ ................................................. H01J 1/60
[52] U.S. Cl. ........................... 315/136; 315/130; 315/131; 315/256; 315/291
[58] Field of Search ........................... 315/129, 130, 315/131, 135, 136, 185 R, 189, 256, 291, 315; 340/642

[56] References Cited

U.S. PATENT DOCUMENTS

| | | | |
|---|---|---|---|
| 4,398,178 | 8/1983 | Russ et al. | 340/310 A |
| 5,034,659 | 7/1991 | Taniguchi | 315/131 |
| 5,099,177 | 3/1992 | Taniguchi et al. | 315/130 |
| 5,168,198 | 12/1992 | Watanabe | 315/130 |
| 5,243,340 | 9/1993 | Norman et al. | 340/953 |
| 5,359,325 | 10/1994 | Ford et al. | 315/130 X |

FOREIGN PATENT DOCUMENTS

| | | |
|---|---|---|
| 0284592 | 9/1988 | European Pat. Off. . |
| 938079 | 12/1955 | Germany . |
| 2027989 | 12/1971 | Germany . |
| 3635682 | 4/1988 | Germany . |
| 1424802 | 2/1976 | United Kingdom . |

Primary Examiner—Robert Pascal
Assistant Examiner—Haissa Philogene
Attorney, Agent, or Firm—Eckert Seamans Cherin & Mellott

[57] ABSTRACT

The invention relates to a method and system for communicating from the secondary side of an isolation transformer (6) to receiver means, the primary of said transformer being connected via a power cable to a circuit fed with a periodic voltage from a constant-current generator, said receiver means being connected to said circuit. More particularly, switch means (30) are arranged for generating communicating signals by momentarily affecting the impedance on the secondary side so as to generate one or more voltage pulses on the primary side (8) of the transformer for propagation along the cable to said receiver means.

25 Claims, 5 Drawing Sheets

SYSTEMS AND METHODS FOR TRANSMITTING PULSE SIGNALS

BACKGROUND OF THE INVENTION

Field of the Invention

The present invention relates to systems and methods for forming pulse signals by operation of switch mechanisms causing impedance variations in a circuit containing a transformer.

In accordance with a first embodiment of the invention a method and a system are provided for communicating from the secondary side of an isolation transformer to a processor via operation of a circuit containing an appropriate switch mechanism providing impedance variations forming pulsed voltage signals which are transmitted through the primary of said transformer onto a power transmission line or cable.

According to a further embodiment of the invention a monitoring system is provided for airfield lighting lamps powered in series from an ac current supply via a transmission or supply cable. In the system, each of the lamps is associated with an isolation transformer having a secondary side containing the lamp, each lamp having assigned thereto a unique address and an associated lamp monitoring unit which is able to communicate with a communicating unit by means of a communicating signal transmitted over said transmission cable.

DESCRIPTION OF RELATED ART

At airports, lighting systems are used for directing all phases of airplane operations including take offs, landings, taxiing and related aircraft movement. These lighting systems often have a large number of lamps and it is important for failed lamps to be detected and replaced as quickly as possible, especially during times of low visibility. Otherwise, the consequences of planes missing taxiways or warning signals such as a stop signal can be catastrophic. Since visual lamp inspection increases the risk for an accident and is costly to perform, automatic lamp monitoring systems have been developed.

Heretofore, the lamps in lighting systems usually have been fed by a constant current power supply over a transmission or supply cable. In such systems, the lamps are connected in series via isolation transformers with the supply cable. The most common type of automatic lamp monitoring system monitors the current and/or the voltage supplied to the cable. If a lamp fails, the impedance in the loop changes, and this is reflected in the current and/or voltage detected by a sensing unit. The disadvantage with this system is that there is no information which is fed to the sensing unit for identifying the failed lamp. It is, therefore, difficult to determine the necessity or urgency for replacing the lamp. Also, if a large number of lamps are connected to the circuit, the change in the impedance caused by lamp failure can be so small that it becomes difficult to detect.

Another type of monitoring system is based upon assigning a unique address along with a monitoring unit to each lamp. When the lamp fails, the unit short-circuits the lamp and periodically breaks the short-circuit in a timed sequence determined by the address of the lamp.

Identification of the failed lamp is made by determining the time (with regard to some reference) at which the change of impedance occurs in the loop. The disadvantage with this system is that the change of impedance due to lamp failure can again be so small that it is difficult to detect.

Yet another type of monitoring system includes a monitoring unit for each lamp, which communicates with a central unit by transmitting a high frequency signal over the transmission cable. Systems of this type, which are available today, are all relatively expensive. They use transformers along with signal amplification equipment or relatively large choke coils. It is, therefore, difficult to automate the production of the monitoring units, and the electronics cannot be integrated into a single integrated circuit solution, a so-called ASIC (Application Specific Integrated Circuit).

SUMMARY OF THE INVENTION

It is an object of the present invention to provide communication methods for monitoring systems which do not require signal amplification equipment or associated components, and therefore makes possible the production of monitoring units at a significantly reduced cost.

It is a further object to provide methods for generating communication signals by momentarily affecting the impedance on the secondary side of a transformer so as to generate one or more voltage pulses on the primary side of the transformer for propagation along a cable to receivers, processors or central monitoring units.

Another object is to provide systems for generating pulse signals by momentarily affecting the impedance on the secondary side of a tranformer winding so as to generate one or more voltage pulses on the primary side of the transformer for propagation along the cable to receivers, processors or central monitoring units.

A still further object according to the present invention is to provide a lighting system for installations such as airfields including units associated with each lamp in the lighting system for generating communication signals when the lamp is in an operating, non-failed condition. The communication signals are produced in a communicating unit by momentarily affecting the impedance on a secondary side of a transformer winding so as to generate one or more voltage pulses on the primary side of the transformer for propagation along a cable to a receiver, processor or central monitoring unit. In a preferred embodiment, the signals are supplied at a time interval referenced by a synchronizing signal and determined by the unique address of each lamp in the system. The system further includes apparatus associated with the communicating unit for detecting the non presence of the communication signals from a failed lamp.

Thus, the present invention is based on the discovery that a voltage pulse will occur on the primary side of an isolation transformer if the impedance of the secondary side momentarily changes while current is flowing through the transformer. The size of the voltage pulse is dependent upon, among other things, the supply voltage and the amount of impedance change. If the transformer is connected to a transmission cable, the pulse propagates along the cable and can be used as a signal from the transformer's secondary side to a receiver, processor or central monitoring unit connected to the cable at a location remote from the transformer.

In a preferred embodiment of our invention, a change in the impedance is achieved by positioning a solid state or mechanical or electromechanical switching apparatus such as a transistor, a reed relay, a commutator or the like in series with the load on the secondary side of a transformer and interrupting the current on the secondary side for very short periods, to thereby create large voltage pulse signals on the primary side of the isolation transformer. It should be noted that the pulse signals so produced have frequencies which are distinguishable from other signalling frequencies and background noise in the circuit in the absence of any amplification means.

In another preferred embodiment, a change in impedance is created by connecting such a switching apparatus in parallel to the load and allowing the switch to short-circuit the load for very short periods.

In either case, the periods of changed impedance are chosen to be of such short duration that the influence on the load supply is neglible.

DESCRIPTION OF THE DRAWINGS

Embodiments of the invention will now be described more closely below with reference to the accompanying drawings, on which

DETAILED DESCRIPTION

Figure 1:
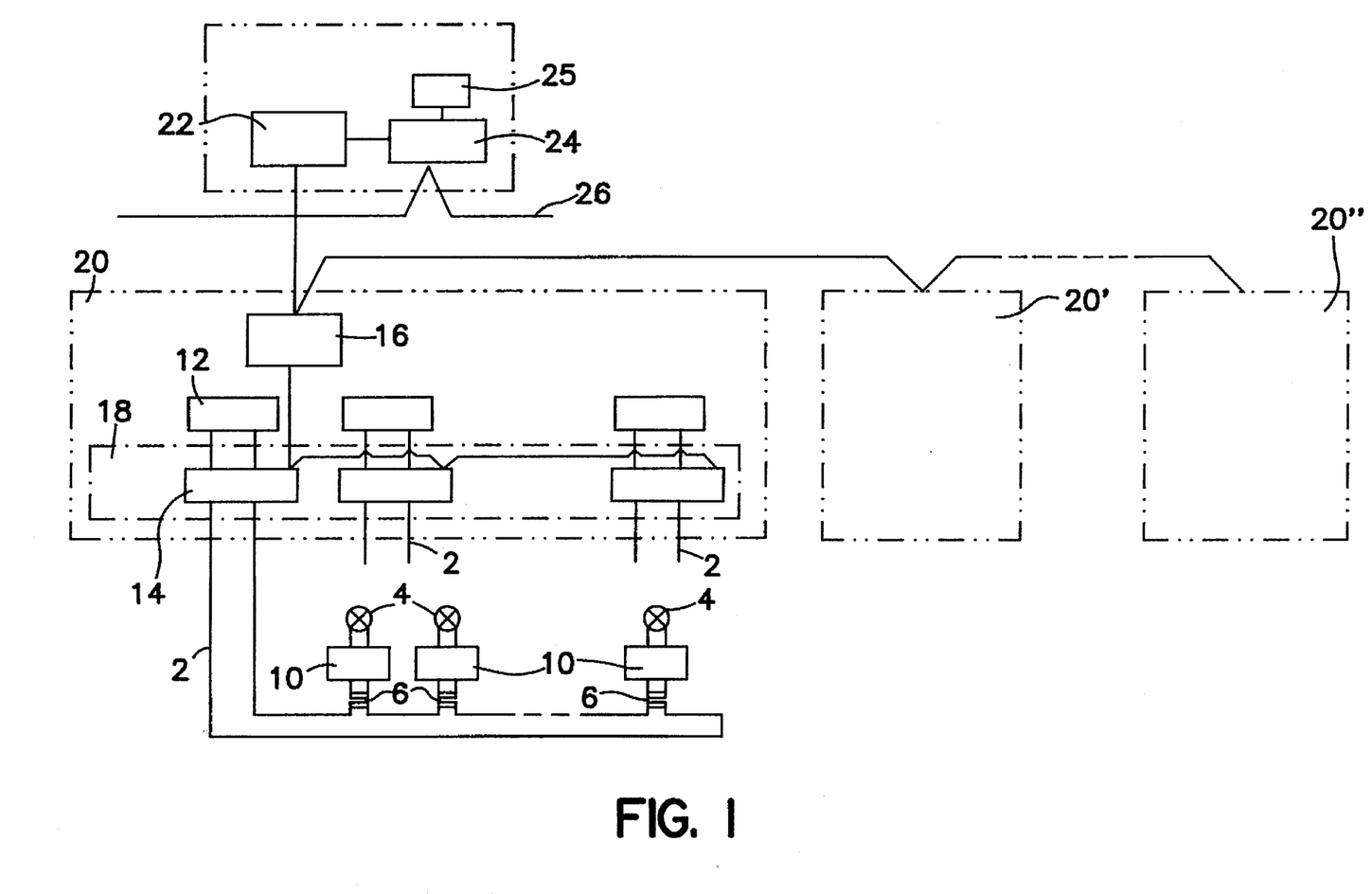
FIG. 1 is a schematic block diagram layout of an airfield lighting monitoring system including monitoring units according to a first embodiment.

The airfield lighting monitoring system shown in FIG. 1 includes a number of current supply loops 2 for lamps 4, only one of said loops being shown in its entirety in the Figure. Each lamp 4 is connected to its associated loop 2 via a secondary winding 5 of an isolation transformer 6, the primary winding 8 of which is series connected in the current supply loop, and via a light monitoring unit 10. Each current supply loop 2 is fed by a constant current regulator 12 via a communicating unit 14. A concentrator unit 16 is connected in a multi-drop configuration to a group 18 of the communicating units 14. The units 14 and 16 will be described more closely below.

The concentrator unit 16 and its associated elements, described above, together form a sub-unit 20, which can e.g. be devoted to a certain part of the lighting system of an air field. The lighting system can include a required number of similar sub-units, of which some are indicated at 20' and 20".

The concentrator units 16 in said sub-units are connected to a central concentrator unit 22 via multi-drop modems.

The central concentrator unit 22 can be connected to a computer 24 with a display 25. The computer 24 can be further connected to other systes via for example a local area network (LAN) 26. The unit 22 and computer 24 can e.g. be localized in a control room 27, or some other suitable place.

The design and function of the different elements of the system described thus far will appear more in detail from the description which will now be given of the operation of the system.

Generally, in the isolation transformers used in a system supplied with constant current, the current flowing through the secondary winding is proportional to the current flowing through the primary winding and, within certain limits, independent of the load on the secondary side. The voltage across the primary winding is proportional to the voltage on the secondary side. The proportionality is in both cases mainly given by the relation between the number of wire turns on the windings.

If the load on the secondary side is changed, the voltage on the primary side is thus changed. If the load is changed while the current is flowing through it and during a short time in comparison to the period of the current, a voltage pulse will appear across the primary winding of the transformer.

The communicating unit 14 sends a synchronizing signal on the power cable 2. Each light monitoring unit 10 counts halfcycles (50 or 60 Hz) of the supply current occurring after the receipt of the synchronizing signal, and has an individual address expressed as a certain number of such counted halfcycles, assigned to the monitoring unit. When this individually assigned number of halfcycles has been counted in a light monitoring unit 10, and if this light monitoring unit has a functioning lamp connected, it transmits a status signal to the associated communicating unit 14. The signal is transmitted through the corresponding isolation transformer 6 and via the power cable 2 to the communicating unit 14. A row of such status signals will thus be transmitted to each communicating unit 14 from the light monitoring units 10 connected thereto.

A light monitoring unit 10 connected to a field lamp 4 cannot send any signals, as described more closely below. Thus, for each light monitoring unit 10 having a failed lamp connected thereto, there will be a gap in the row of status signals.

The communicating unit 14 detects the responses from the light monitoring units and reports the addresses of non-responding light monitoring units via the local concentrator unit 16 to the central concentrator unit 22. In the central concentrator unit 22, the addresses are stored in a database accessible to the computer 24 in the control room 27.

On the display 25 the number of failed lamps 4 and the position of each failed lamp can be displayed. Different alarm criteria can be set in the central concentrator unit 22 via the computer 24.

As will also be described more closely below the communication between the light monitoring units and the associated communicating unit is carried out by high frequency signals superimposed on the 50 Hz or 60 Hz current in the power cable.

Figure 2:
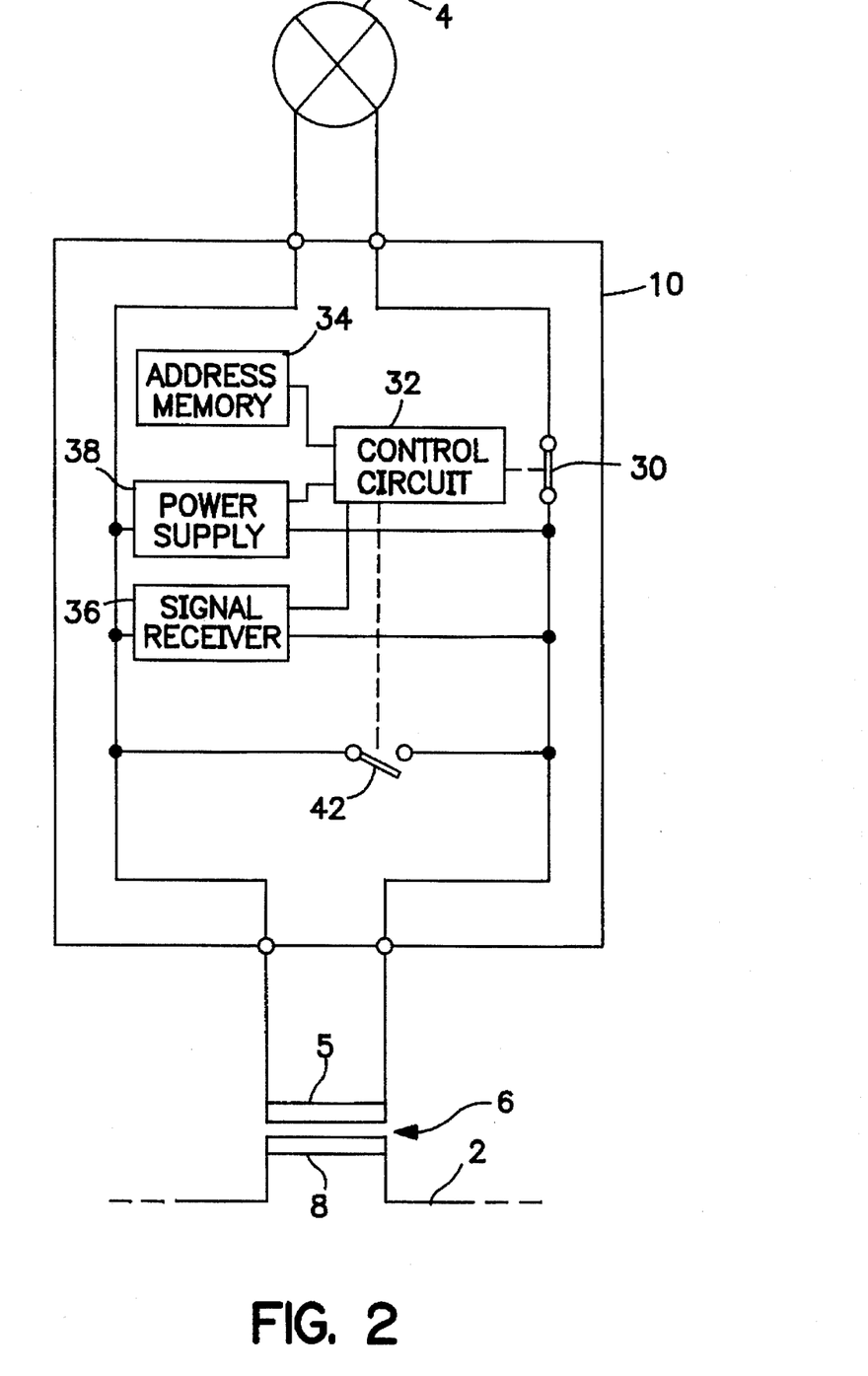
FIGS. 2–4 are schematic block diagrams of some of the blocks in FIG. 1.

A schematic block diagram of a light monitoring unit 10 is shown in FIG. 2, also illustrating the connection of the lamp 4 into circuit: with the secondary winding 5 of the transformer 6.

The light monitoring unit 10 is schematically shown to include a switch 30 in series with the lamp 4 connected for interrupting the current in the lamp circuit. The unit 10 furthermore includes a control circuit or logic unit 32, e.g. a microprocessor for controlling the switch 30, an address memory 34 for storing the above mentioned address thereof and a receiver 36 connected for receiving the synchronization signal from the unit 14 and forwarding it to the logic unit 32. The unit 10 also contains a dc power supply unit 38 for the logic unit 32 and receiver 36.

Also connected over the secondary winding 5, and thus in parallel with the lamp 4, is a switch 42 controlled by the control circuit 32. In a manner known to the man of the art the design of the switch 30 can e.g. be based on the use of field-effect transistors.

The logic unit also performs counting of the halfcycles of the current received from the current regulator 12 as has been described above. When the accumulated count matches the contents in the address memory 34, and if the connected lamp 4 is functioning, a high frequency signal is created across the secondary winding 5 of the isolation transformer 6 by pulse-wise interrupting the current through the lamp 4 by means of the switch 30 as controlled by the control circuit 32.

If the lamp circuit is open, due to failure of the lamp 4, the high frequency signal cannot be emitted since the secondary circuit of the transformer 6 is broken up by the failed lamp and the secondary winding 5 is instead shorted by the control circuit 32 by means of the switch 42. The switch 12 is intermittently opened again during short time intervals, typically a few microseconds. During these intervals the control circuit 32 measures the voltage across (or the current through) the lamp 4 by means of the signal receiver 36 and thereby detects when the lamp has been replaced and when it is time for releasing the short-circuit.

The memory for storing the address of each light monitoring unit 10 can be a PROM-memory.

Figure 3:
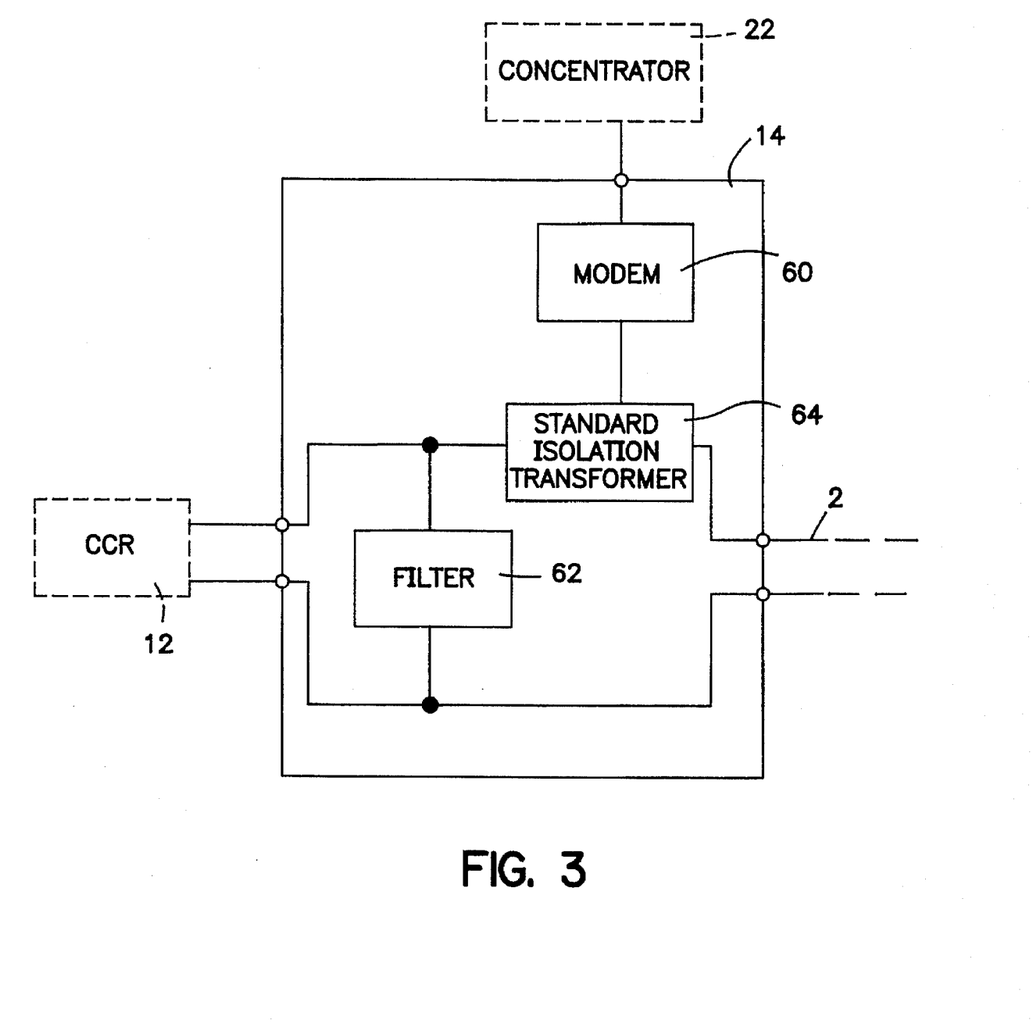

A schematic block diagram of the communicating unit 14 is shown in FIG. 3. The communicating unit comprises a modem 60, a filter 62 and a coupling transformer 64.

The modem 60 is connected via the transformer 64 to the series circuit 2 powering the lights 4, for deriving the above mentioned synchronizing signal from the period of the current in the series circuit, for sending the synchronizing signal and for detecting the responses from the light monitoring units. The modem 60 is also connected to the concentrator 22 for reporting the address of light monitoring units with failed lamp.

The filter 62 reduces noise in the current coming from the constant current regulator 12 and prevents signals coming from the modem 60 and the units 10 from passing back into the regulator unit 12.

As an alternative to the filter 62 connected as shown, a corresponding filter can be connected on the primary side of the high voltage transformer, not shown, included in the current regulator 12. The advantage of such a solution is lower cost due to the isolation requirements in this position being less severe.

Figure 4:
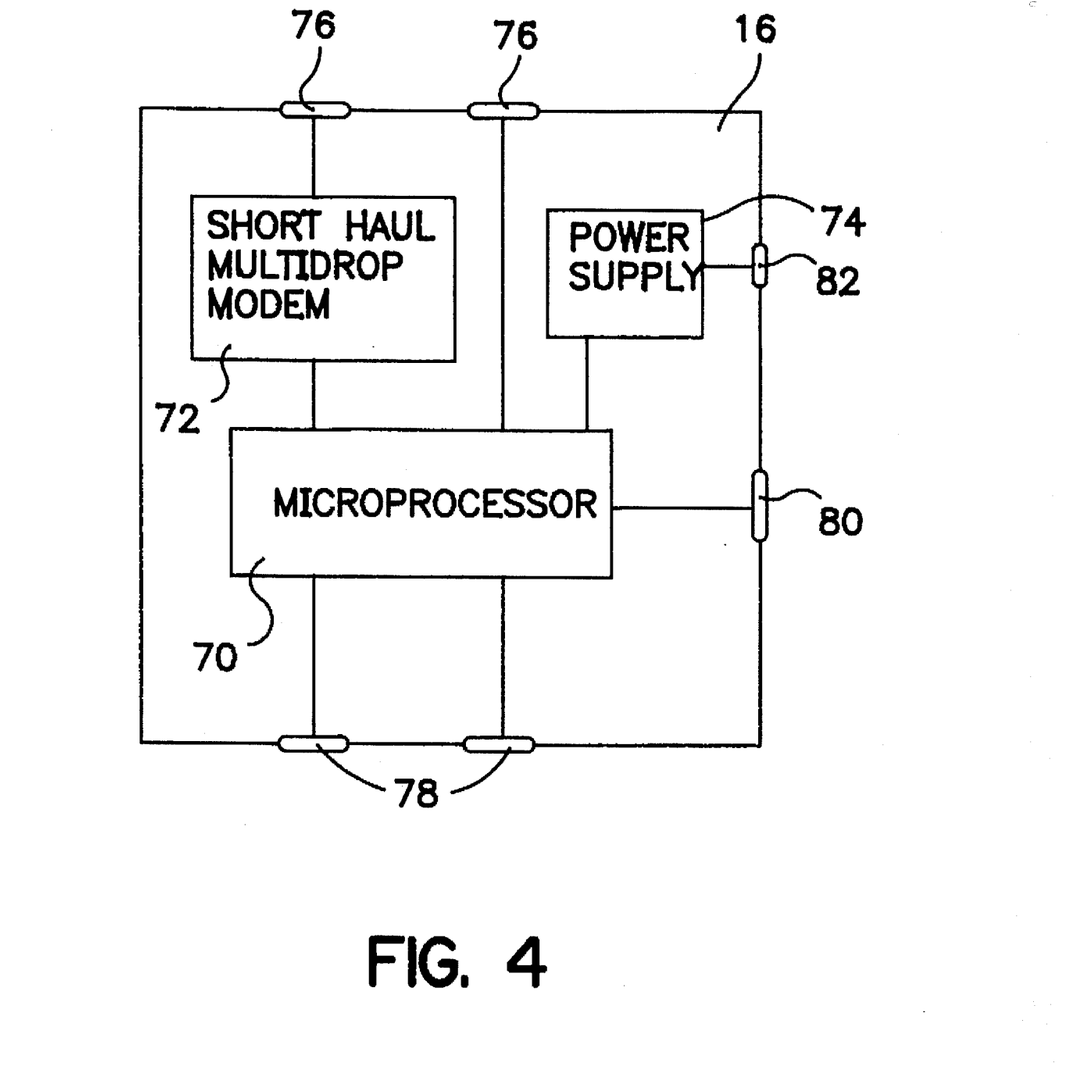

According to FIG. 4, the concentrator unit 16 comprises a microprocessor 70, a modem 72 and a power supply 74. Connections to an information system, not shown, to communicating units 14, to the computer 24, and to the power net are indicated at 76, 78, 80, and 82, respectively.

The function of the concentrator unit 16 is to collect the information from the connected communicating units 14 and store it in a database of the microprocessor 10, where the computer 24 in the control room 24 can access it.

The concentrator unit 16 may also be designed to test the acquired data against alarm criteria and given an alarm if required.

Figure 5:
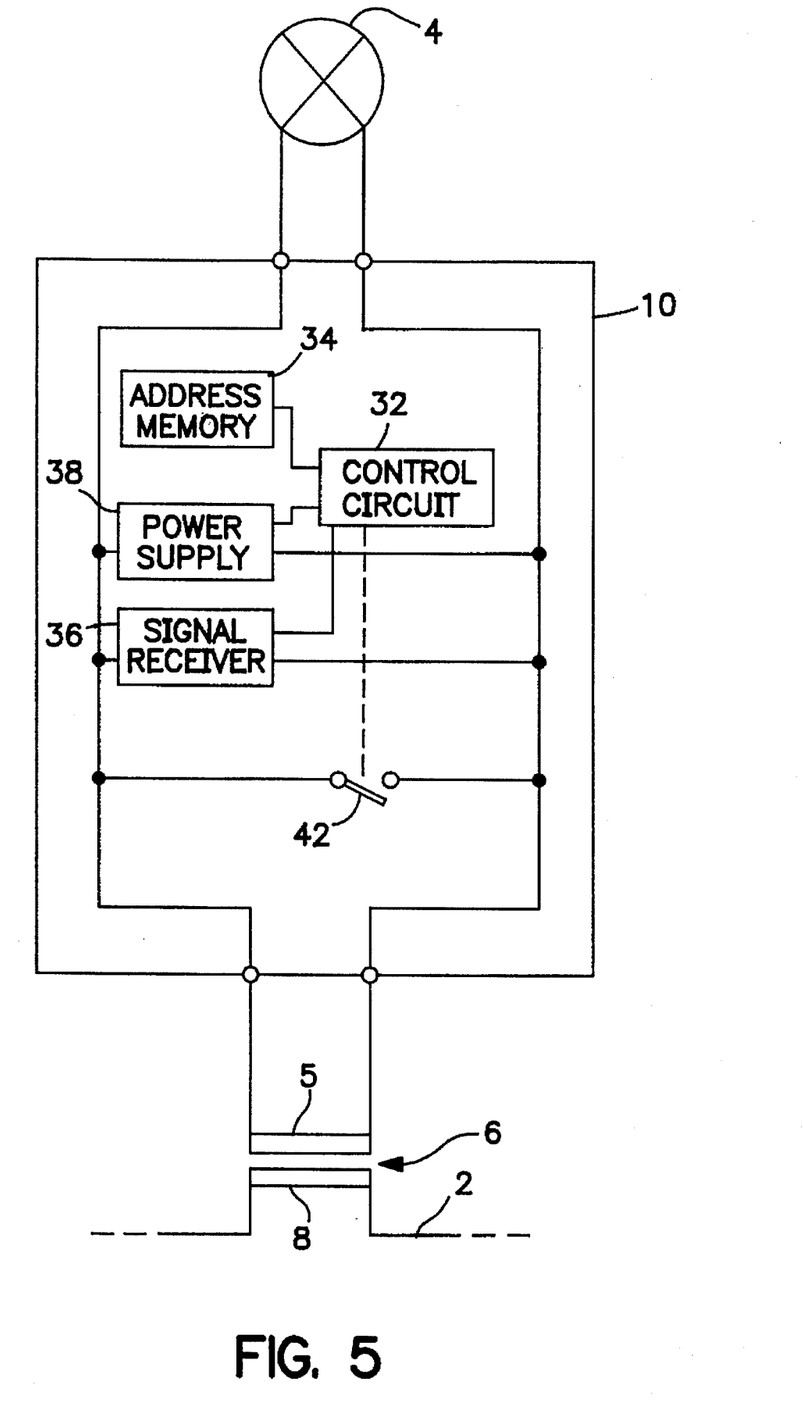
FIG. 5 is a schematic block diagram of a second embodiment of a monitoring unit designed for communication in an airfield lighting monitoring system.

The embodiment of the monitoring unit 10 according to FIG. 5 includes the same components as the monitoring unit according to FIG. 2 except the switch 30.

The operation of light monitoring units according to FIG. 5 differs from that of monitoring units according to FIG. 2 in that the status signal is transmitted by shorting the current on the secondary side in short intervals by means of the switch 42 instead of by means of a series switch.

With a monitoring system of the kind described above, each lamp in airfield lighting circuits can be individually monitored. The system can continuously provide updated information about the position of failed lamps. Apparatus may be provided for displaying the information locally, or transmitting it to any other information system at the airfield.

The system requires no extra cabling on the field as it operates on existing power cables.

In still further embodiments the light monitoring unit 10 may store its address in an EEPROM-memory, which permits the stored address to be changed or receive its address as a binary code from switches or jumper connections in the unit 10, or from magnetic sensors which detect a row of magnets with different magnetization direction that are mounted at each lamp.

In yet another embodiment the light monitoring units 10 may send a status signal after they have received an addressed request for status signal.

Although the foregoing specification describes only the embodiments of this invention shown and/or described, it should be clear that other embodiments may be articulated as well. For example, the embodiments specifically described herein are directed to communication from lamp monitoring units supervising the lamp regarding failure/non-failure. However, it should be noted that the communication systems and methods according to the present invention are also suitable for relaying other information over a series cable such as status information regarding on/off-condition in cases when the monitoring unit 10 is programmed to switch on/off the lamp on received request, or status information from vehicle detectors installed at an airfield to keep track of or monitor aircraft or vehicular movement on the field, where the detectors are connected to the series cable.

Thus, the terms and expressions used herein serve only to describe the invention by example and not to limit the invention. It is expected that others will perceive differences which, while different form the foregoing, do not depart from the scope of the invention herein described and claimed. In particular, any of the specific constructional elements described may be replaced by any other known elements having equivalent function.

I claim:

1. A method for communicating from a secondary side of an isolation transformer to receiver means in a system including a primary of said transformer connected via a power cable to a circuit fed with a periodic voltage from a constant current generator, said receiver means being connected to said circuit and said secondary side including a load comprising:

generating high frequency communicating pulse signals by pulse wise affecting an impedance of the secondary side by means of a switch in series with the load, thereby changing the load on the secondary side while current is flowing through it during a short time period in comparison to the period of the current, controlled by a control circuit, whereby a voltage pulse will appear across the primary of said transformer during said short time;

and transferring said voltage pulse to the primary winding of the transformer as said pulse signals for propagation along the cable to said receiver means while current is flowing through the transformer during said period.

2. A method according to claim 1, comprising affecting the impedance on the secondary side by interrupting the current flow on the secondary side.

3. A method according to claim 1, comprising generating, providing the load is not defective, said communication pulse signals at a time interval referenced to a synchronizing signal and determined by a unique address assigned to the load, and detecting the non-presence of said communication signal from a defective load.

4. A method according to claim 3, comprising short-circuiting said secondary side as long as an associated load is defective.

5. A system for communicating from a secondary side of an isolation transformer to receiver means, a primary of said transformer being connected via a power cable to a circuit fed with a periodic voltage from a constant-current generator, said communication means being connected to said circuit, and said secondary side including a load comprising means for generating high frequency communicating pulse signals by pulse wise affecting an impedance of the secondary side by means of a switch in series with the load, thereby changing the load on the secondary side while current is flowing through it during a short time in comparison to the period of the current, controlled by a control circuit, whereby a voltage pulse will appear across the primary of said transformer during said short time, transferring said voltage pulse to the primary winding of the transformer as said pulse signals for propagation along the cable to said receiver means while current is flowing through the transformer during said period.

6. A system according to claim 5, comprising means for affecting the impedance on the secondary side by changing the load on the secondary side.

7. A system according to claim 5, comprising means for affecting the impedance on the secondary side by interrupting the current flow on the secondary side.

8. A system according to claim 6, means for affecting the impedance on the secondary side by short-circuiting the load on the secondary side.

9. A system according to claim 5, comprising means for generating, provided the load is not defective, said communication signal at a time interval referenced to a synchronizing signal and determined by a unique address assigned to the load, and by means for detecting the non-presence of said communication signal from a defective load.

10. A system according to claim 9, comprising means for affecting said impedance so as to inhibit transmission of said communication signal in case the load is defective.

11. A system according to claim 10, comprising means for short-circuiting said secondary side as long as the associated load is defective.

12. A monitoring system for airfield lighting lamps, which are powered from an ac current supply via a series cable and each lamp being associated with an isolation transformer, including a secondary side in which the lamp is located, each lamp having assigned thereto a unique address and an associated lamp monitoring unit, which is able to communicate with a communicating unit by means of a communicating pulse signal over said series cable, comprising means associated with each lamp for generating said communication signal, provided the lamp has not failed, by means of a switch in series with the lamp controlled by a control circuit, said communication signal at a time interval referenced to a synchronizing signal and determined by the unique address of the lamp, by pulse wise affecting an impedance of the secondary side by means of said switch in series with the lamp, thereby changing the lamp load on the secondary side while current is flowing through it during a short time in comparison to the period of the current controlled by said control circuit, whereby a voltage pulse will appear across the primary of said transformer during said short time, transferring said voltage pulse to the primary winding of the transformer as said pulse signals for propagation along the cable to said receiver means while current is flowing through the transformer during said period.

13. A system according to claim 12, comprising means for affecting the impedance on the secondary side by changing the load on the secondary side.

14. A system according to claim 12, comprising means for affecting the impedance on the secondary side by interrupting the current flow on the secondary side.

15. A system according to claim 12, comprising means for affecting the impedance on the secondary side by short-circuiting the load on the secondary side.

16. A system according to claim 12, characterized by means for interconnecting each lamp and said impedance affecting means so as to inhibit transmission of said communication signal as a result of said lamp failing.

17. A system according to claim 12, wherein said impedance affecting means is a circuit switching means in said secondary side controlled by said monitoring unit.

18. A system according to claim 12, wherein said circuit switch is intermittently opened again during short time intervals, during which said control means measures the voltage across, or the current through, the lamp for detecting when the lamp has been removed.

19. A communication method for monitoring systems wherein pulse signals are generated and transmitted comprising:

causing variation of impedance in a circuit containing at least one switching means, one in series with a load, and a transformer by pulse wise affecting said impedance thereby changing the load while current is flowing through it during a short time in comparison to the period of the current by means of said switching means controlled by a control circuit means, said transformer having at least a primary and a secondary winding, in a manner such that pulses are applied to said secondary winding of the transformer during said period;

transferring said pulses to the primary winding of the transformer as said pulse signals; and transmitting said pulse signals to a receiving means.

20. The method of claim 19 wherein said pulse signals have frequencies distinguishable from other signalling frequencies and background noise in the circuit absent amplification means.

21. A system for monitoring a load comprising:

a circuit containing at least one switching means, one in series with a load, and a transformer, said transformer having at least a primary and a secondary winding, said secondary winding being electronically interconnected with a load;

said switching means generating pulse signals, on the primary winding of said transformer as a result of the operation of said switching means causing variation of the impedance on the secondary winding by pulse wise affecting the impedance thereby changing the load on the secondary side by said one switching means in series with the load while current is flowing through it during a short time in comparison to the period of the current as controlled by a control circuit means while current is flowing through said transformer during said period;

a constant current generator supplying a constant current to said primary winding or said transformer via a power cable; and said pulse sign&is combining with said constant current to provide a signal indicative of the status of the load; and to a processing means interconnected with said circuit for receiving said pulse signals.

22. The system of claim 21 wherein said at least one switching means comprises a transistor.

23. The system of claim 21 wherein said circuit includes two switching means.

24. The system of claim 23 wherein said two switching means are transistors.

25. A monitoring and control system for an airfield lighting arrangement comprising:

light units installable at light unit locations, wherein each light unit is connected to an electronic unit;

said electronic unit comprising a regulator, a monitoring unit and a modem, for monitoring the operation of each of the light units;

each light unit having a control circuit containing at least one switching means, one in series with a load, and a transformer;

said transformer having at least a primary and secondary winding and means for generating pulse signals, on the primary winding of said transformer as a result of the operation of said switching means causing variation of the impedance on the secondary winding, thereby changing the load on the secondary side by said one switching means in series with the load while current is flowing through it during a short time in comparison to the period of the current by pulse wise affecting the impedance controlled by a control circuit means while current is flowing through said transformer during said period which impedance is transferred to the primary winding; and means for transmitting said pulse signals to said monitoring unit.

* * * * *